(12) United States Patent
Yamamoto

(10) Patent No.: US 8,181,228 B2
(45) Date of Patent: May 15, 2012

(54) NETWORK CONSTRUCTING METHOD AND COMMUNICATION APPARATUS

(75) Inventor: Tetsuya Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 12/245,857

(22) Filed: Oct. 6, 2008

(65) Prior Publication Data
US 2009/0044014 A1    Feb. 12, 2009

Related U.S. Application Data

(63) Continuation of application No. 10/724,764, filed on Dec. 2, 2003, now Pat. No. 7,451,480.

(30) Foreign Application Priority Data

Dec. 9, 2002 (JP) ................................. 2002-356737

(51) Int. Cl.
H04L 29/06 (2006.01)

(52) U.S. Cl. .......................................... 726/3; 709/223

(58) Field of Classification Search .................. 726/3, 5, 726/6, 7; 380/270, 271, 273; 709/223, 224, 709/228; 370/254; 715/700, 734–739
See application file for complete search history.

(56) References Cited

U.S. PATENT DOCUMENTS

| 6,684,110 B1 | 1/2004 | Kutsuna et al. ............... 700/17 |
| 6,810,269 B1 | 10/2004 | Aramaki ....................... 455/560 |
| 6,847,997 B1 | 1/2005 | Kleiner ......................... 709/224 |
| 6,870,822 B2 | 3/2005 | Balogh ......................... 370/332 |
| 6,975,857 B2 | 12/2005 | Tourrilhes et al. ............ 455/420 |
| 6,975,863 B1 | 12/2005 | Miernik ........................ 455/434 |
| 7,099,694 B1 | 8/2006 | Aramaki et al. .............. 455/561 |
| 7,103,661 B2 | 9/2006 | Klein ............................ 709/225 |
| 7,120,129 B2 | 10/2006 | Ayyagari et al. ............. 370/255 |
| 7,146,130 B2 | 12/2006 | Hsu et al. .................... 455/3.04 |
| 7,212,513 B2 | 5/2007 | Gassho et .................... 370/338 |
| 7,231,605 B1 * | 6/2007 | Ramakesavan ............... 715/734 |
| 7,451,480 B2 * | 11/2008 | Yamamoto ........................ 726/3 |
| 2001/0023446 A1 * | 9/2001 | Balogh .......................... 709/229 |
| 2002/0007407 A1 | 1/2002 | Klein ............................ 709/225 |
| 2002/0019985 A1 | 2/2002 | Fuccello et al. ............. 725/133 |
| 2002/0176366 A1 * | 11/2002 | Ayyagari et al. ............. 370/245 |
| 2003/0142641 A1 * | 7/2003 | Sumner et al. ................ 370/328 |

(Continued)

FOREIGN PATENT DOCUMENTS

| EP | 0 967 815 A2 | 12/1999 |
| JP | 2000-83284 | 3/2000 |
| JP | 2000-354048 | 12/2000 |

(Continued)

OTHER PUBLICATIONS

Jul. 20, 2007 Japanese Official Action in Japanese Patent Appln. No. 2002-356737 (with translation).

*Primary Examiner* — Edward Zee

(74) *Attorney, Agent, or Firm* — Fitzpatrick, Cella, Harper & Scinto

(57) ABSTRACT

In a wireless network communication device, multiple items of network identification information, which are for identifying wireless network systems, are read out of a memory and displayed on a display unit. Network identification information of a wireless network system, which is capable of being constructed anew, is selected from the multiple items of network identification information displayed and a wireless network system corresponding to the network identification information selected is constructed.

12 Claims, 17 Drawing Sheets

```
(SELECT)    1 : abcabcabc   [BUSY]
            2 : Tokyo
            3 : network001
```

U.S. PATENT DOCUMENTS

| | | | |
|---|---|---|---|
| 2003/0154287 A1 | 8/2003 | Sullivan | 709/227 |
| 2003/0204748 A1 | 10/2003 | Chiu | 713/201 |
| 2004/0008652 A1 | 1/2004 | Tanzella et al. | 370/338 |
| 2004/0127204 A1 | 7/2004 | Belmont | 455/418 |
| 2004/0203593 A1 | 10/2004 | Whelan et al. | 455/411 |
| 2005/0043019 A1 | 2/2005 | Nakamura et al. | 455/418 |
| 2006/0239209 A1 | 10/2006 | Ayyagari et al. | 370/254 |

FOREIGN PATENT DOCUMENTS

| | | |
|---|---|---|
| JP | 2001-69151 | 3/2001 |
| JP | 2001-274816 | 10/2001 |
| JP | 2002-344458 | 11/2002 |
| JP | 2003-143156 | 5/2003 |
| JP | 2004-96146 | 3/2004 |

* cited by examiner

FIG. 4

SET ESS-ID (EXECUTE BY PRESSING "ENTER")

FIG. 7

1 : abcabcabc  [BUSY]

2 : Tokyo

3 : network001

FIG. 9

(SELECT)
1 : abcabcabc    [ BUSY ]
2 : Tokyo
3 : network001

FIG. 10

SET WEP KEY (EXECUTE BY PRESSING "ENTER")

F I G. 15
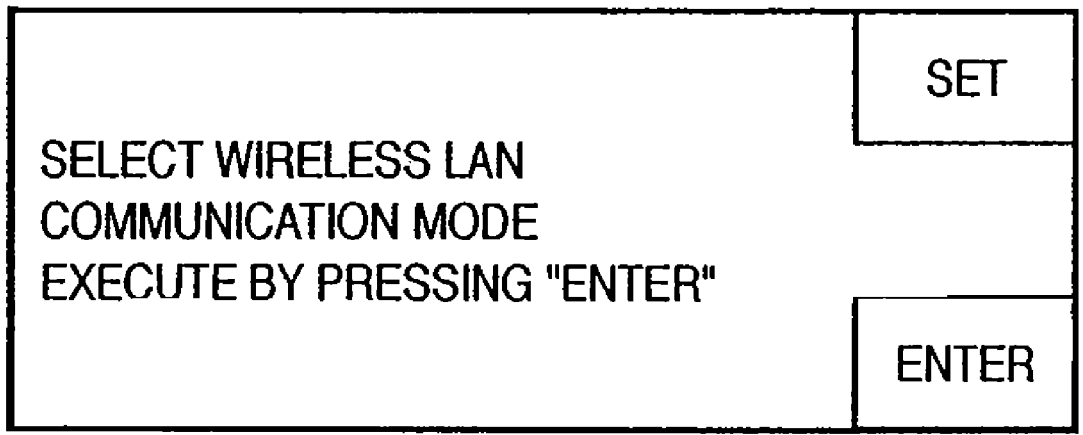

NETWORK CONSTRUCTING METHOD AND COMMUNICATION APPARATUS

This application is a continuation of application Ser. No. 10/724,764 filed Dec. 2, 2003.

FIELD OF THE INVENTION

This invention relates to a configuring technique for constructing a network.

BACKGROUND OF THE INVENTION

In a system comprising a plurality of computers, it is becoming more common to construct a local-area network (LAN) in order to share information and to use information processing devices such as printers more effectively.

In particular, wireless LAN systems in which all or part of the LAN is implemented wirelessly are gradually coming into greater use. The reason for this is that a wireless LAN system does not require the laying of cables. Consequently, it is believed that wireless LAN systems will be utilized even more extensively in the future in view of the convenience of portable information processing devices such as notebook personal computers.

In order to construct such a wireless LAN system, it is necessary first of all for the plurality of personal computers (stations) constructing the system to be configured in a prescribed manner. For example, in a case where communication is performed in an infrastructure mode in a wireless LAN system compliant with IEEE Std 802.11, it is necessary to set an ESS (Extended Service Set)—ID, which is a network identification ID, to the same value at the access points and stations that communicate with each other. Furthermore, in a case where encrypted communication is carried out in order to prevent exposure of data, it is required that a WEP (Wired Equivalent Privacy) key, which is an encryption key, be set to the same value.

Present access points are usually connected to a computer by some means such as wired means, and the above-mentioned settings are made by the computer keyboard. Since this series of operations is laborious, simplification of it is required.

Furthermore, since present stations are generally computers, the above-mentioned settings can be made using the keyboard of one's own computer. However, in a case where the above-mentioned settings will be made in the future at stations having various forms such as that of a facsimile machine, copier or printer, there is a possibility that the settings will entail labor just as in the case of access points at present.

In some wireless LAN systems at the present time, settings are made at the factory at shipping time so that the systems can be put into operation as is. This mitigates labor involved in making settings. However, in a case where a plurality of independent wireless LAN systems are disposed in close proximity to one another, it may be judged that these independent wireless LAN systems belong to the same network if the settings values of each of the systems agree. There is such a problem that the wireless LAN system is not capable of avoiding the interference ascribable to above settings.

SUMMARY OF THE INVENTION

Accordingly, an object of the present invention is to facilitate the implementation of prescribed settings necessary to construct a network.

Another object of the present invention is to avoid interference between independent networks ascribable to configuring of these networks.

According to the present invention, the foregoing objects are attained by providing a method of constructing a network, comprising:

a display step of displaying plural items of network identification information which are stored in a memory;

a selecting step of selecting network identification information of a network, which is capable of being constructed anew, from the plural items of network identification information displayed at the display step; and a constructing step of constructing a network corresponding to the network identification information selected at the selecting step.

In accordance with an embodiment of the present invention, the foregoing objects are attained by providing a method of constructing a network, comprising:

a discriminating step of discriminating network identification information being used in the vicinity; and a display step of displaying plural items of network identification information which are stored in a memory based on the discrimination at the discriminating step.

In accordance with an embodiment of the present invention, the foregoing objects are attained by providing a method of constructing a wireless network, comprising:

a display step of displaying a list of encryption keys which are stored in a memory;

a selecting step of selecting a desired encryption key from a list of encryption keys displayed at the display step; and a communicating step of performing encrypted communication using the encryption key selected at the selecting step.

In accordance with an embodiment of the present invention, the foregoing objects are attained by providing a communication apparatus constructing a network, comprising:

display means for displaying plural items of network identification information which are stored in a memory;

selecting means for selecting network identification information of a network, which is capable of being constructed anew, from the plural items of network identification information displayed by the display means; and constructing means for constructing a network corresponding to the network identification information selected by the selecting means.

In accordance with an embodiment of the present invention, the foregoing objects are attained by providing a communication apparatus comprising:

discriminating means for discriminating network identification information being used in the vicinity; and display means for displaying a list of network identification information which are stored in a memory based on the discrimination by the discriminating means.

In accordance with an embodiment of the present invention, the foregoing objects are attained by providing a communication apparatus comprising:

display means for displaying a list of encryption keys which are stored in a memory;

selecting means for selecting a desired encryption key from a list of encryption keys displayed by the display means; and communicating means for performing encrypted communication using the encryption key selected by the selecting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram illustrating a screen for selecting an ESS-ID setting mode;

FIG. 7 is a diagram illustrating a screen displaying ESS-IDs of neighboring wireless LAN systems;

FIG. 9 is a diagram illustrating a screen for setting the ESS-ID of the new wireless LAN system;

FIG. 10 is a diagram illustrating a screen for selecting a WEP-key setting mode;

FIG. 15 is a diagram illustrating a screen for selecting a wireless LAN communication mode;

DETAILED DESCRIPTION OF THE PREFERRED EMBODIMENTS

Preferred embodiments of the present invention will now be described in detail with reference to the drawings.

[First Embodiment]

A first embodiment will be described taking as an example a facsimile machine serving as a wireless LAN device (station) or access point connectable to a wireless LAN system compliant with IEEE Std 802.11.

Figure 1:
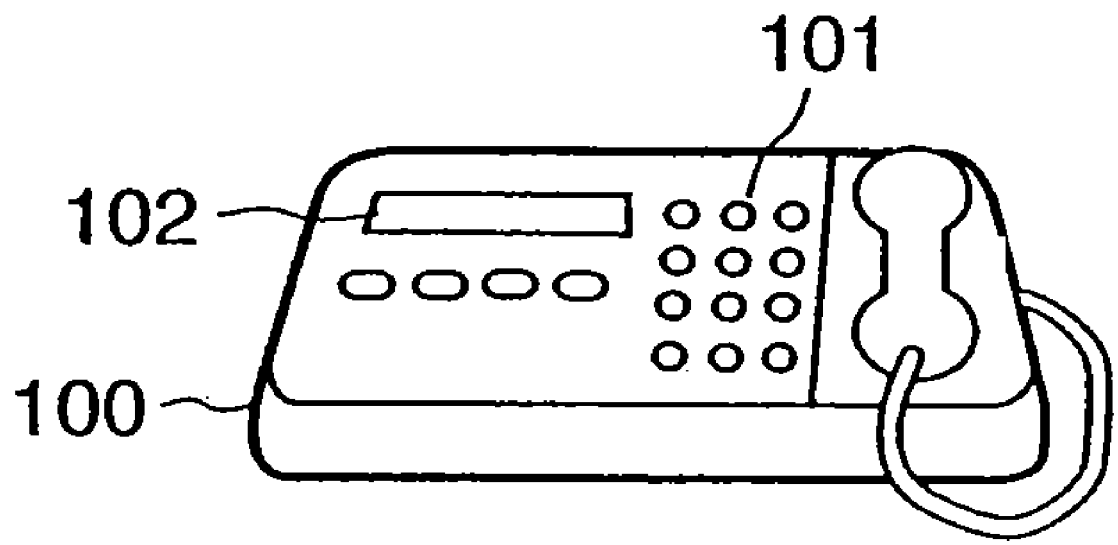
FIG. 1 is an external view of a facsimile machine according to a first embodiment of the present invention.

FIG. 1 is an external view of a facsimile machine according to a first embodiment of the present invention. This facsimile machine is provided in a form having a built-in wireless LAN communication unit, described later, and functions as an access point. However, this does not impose a limitation upon the invention because a wireless LAN communication unit of removable-adapter type may just as well be attached to the facsimile machine.

As shown in FIG. 1, the facsimile machine has a main body 100 provided with buttons 101 functioning as information input means and with a display panel 102 functioning information output means.

Figure 2:
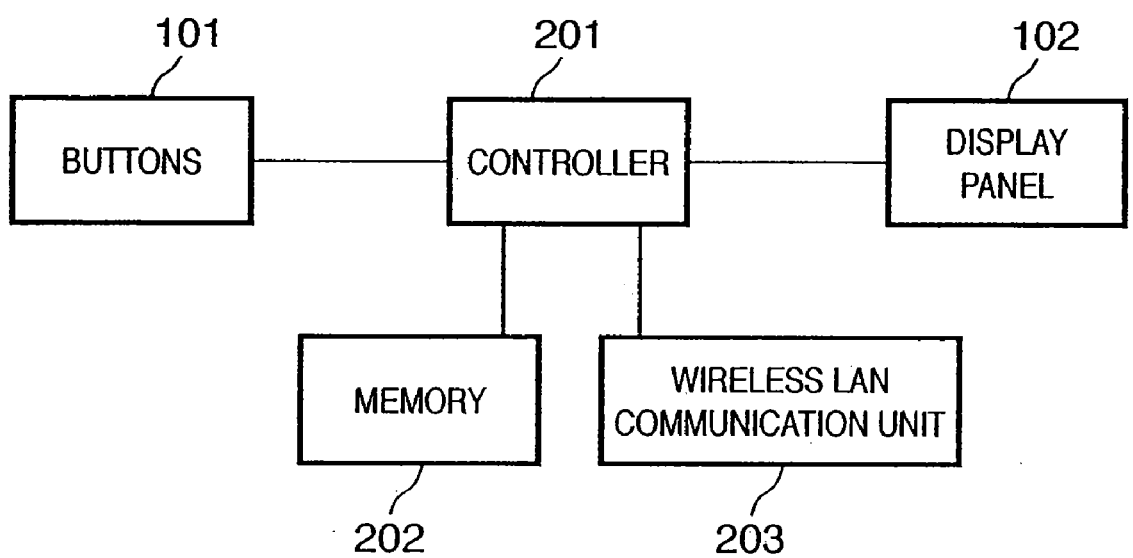
FIG. 2 is a block diagram illustrating components relating to the configuring of the facsimile machine shown in FIG. 1.

FIG. 2 is a block diagram illustrating components relating to the configuring of the facsimile machine shown in FIG. 1. Components same to those shown in FIG. 1 are designated by same reference characters and need not be described again.

A controller 201 in FIG. 2 controls the overall facsimile machine 100. A memory 202. which serves as storage means, stores image data to be transmitted, fax data that has been received, and other data. A wireless LAN communication unit 203 controls communication in the form of an access point in a wireless LAN system. The controller 201 comprises a CPU for exercising control in accordance with a prescribed program, a RAM in which a work area used when the CPU executes control has been defined, and a ROM in which the program of the CPU and control data have been stored.

Components and a setting method about settings when the facsimile machine 100 of the first embodiment is set up in a wireless LAN system as an access point will now be described.

Figure 3:
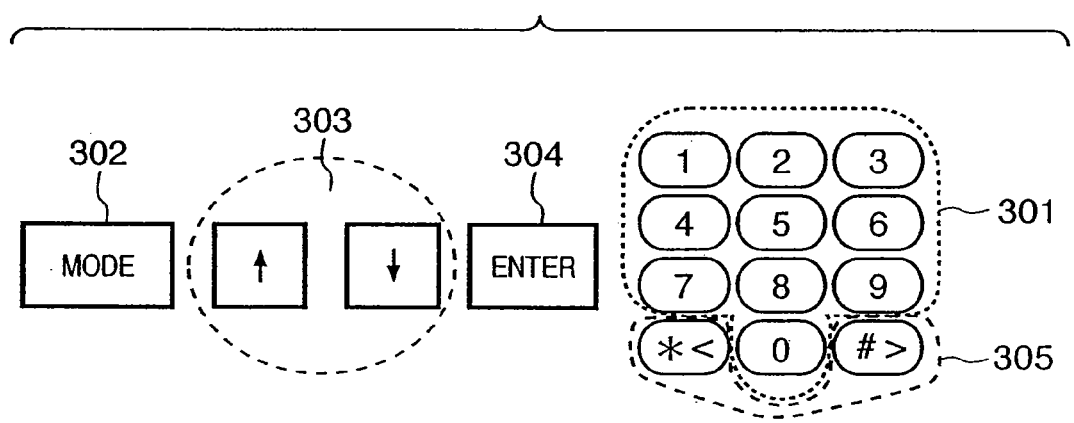
FIG. 3 is a diagram illustrating the details of buttons according to the first embodiment.

FIG. 3 is a diagram illustrating the details of the buttons according to the first embodiment. As shown in FIG. 3, the buttons 101 include numeral buttons 301, a mode button 302, up/down buttons 303, an enter button 304 and right/left buttons 305.

The controller 201 sends and receives data to and from the buttons 101, display panel 102, memory 202 and wireless LAN communication unit 203 and processes data.

Described next is the procedure of an operation performed at the facsimile machine serving as an access point. The operation is for setting an ESS-ID of an ESS (Extended Service Set), which includes one or more BSSs (Basic Service Sets), in one communication-enabled area (referred to also as a service area or cell) composed of an access point and wireless LAN communication device (station) in infrastructure mode.

Figure 4:
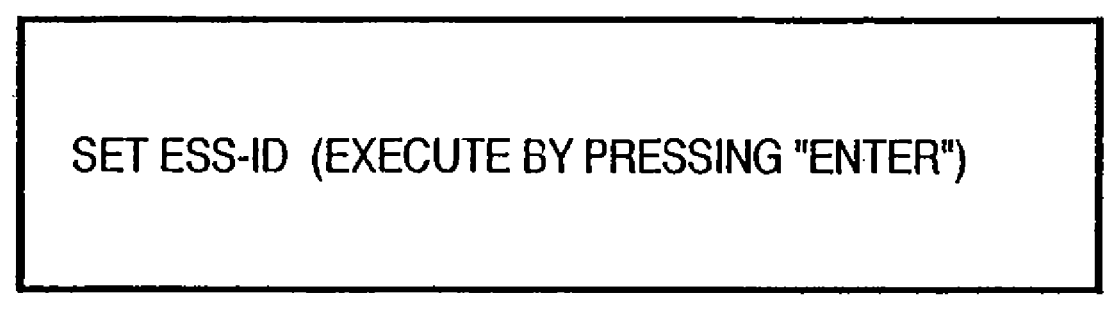

First, a screen of the kind shown in FIG. 4 for selecting an ESS-ID setting mode is displayed on the display panel 102 by pressing the mode button 302 of FIG. 3 a prescribed number of times. The ESS-ID setting mode is activated when the enter button 304 is pressed in accordance with this display on the screen.

Figure 5:
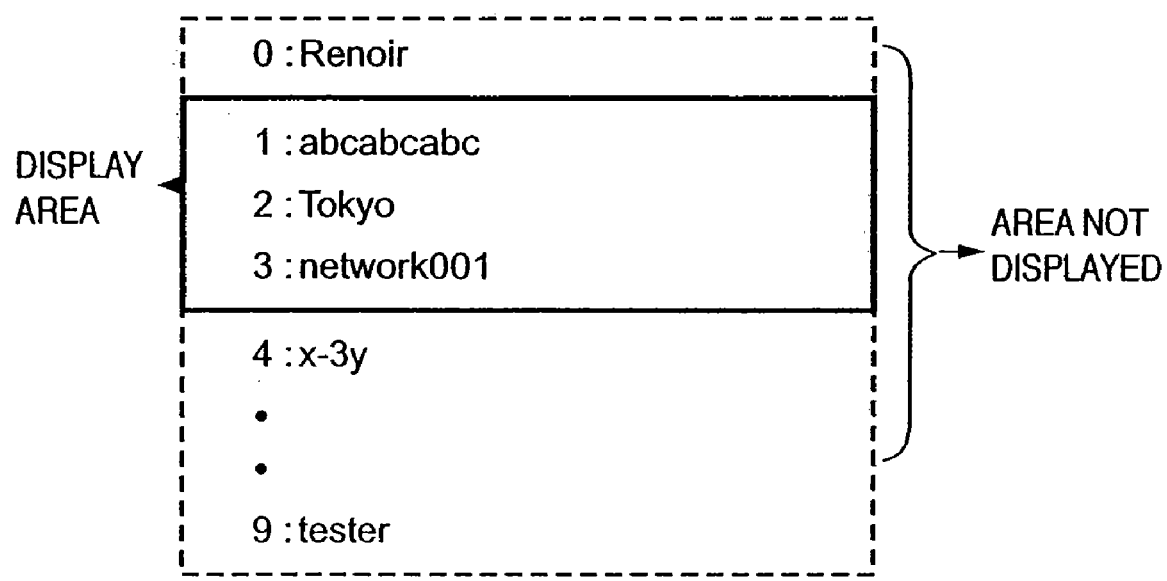
FIG. 5 is a diagram illustrating an example of display of numerals "0" to "9" and symbol strings of one or more characters corresponding to these numerals.

In the ESS-ID setting mode, correspondence between numerals "0" to "9" and symbol strings of one or more characters corresponding to the numerals is displayed, as shown in FIG. 5. If a single screen cannot be displayed on the display panel 102, the screen can be scrolled by the up/down buttons 303 to enable display of data in successive fashion. Further, the corresponding relationship between the numerals and the symbol strings of one or more characters corresponding to the numerals has already been stored in the memory 202. The controller 201 reads this data out of the memory 202 and displays it on the display panel 102.

Figure 6:
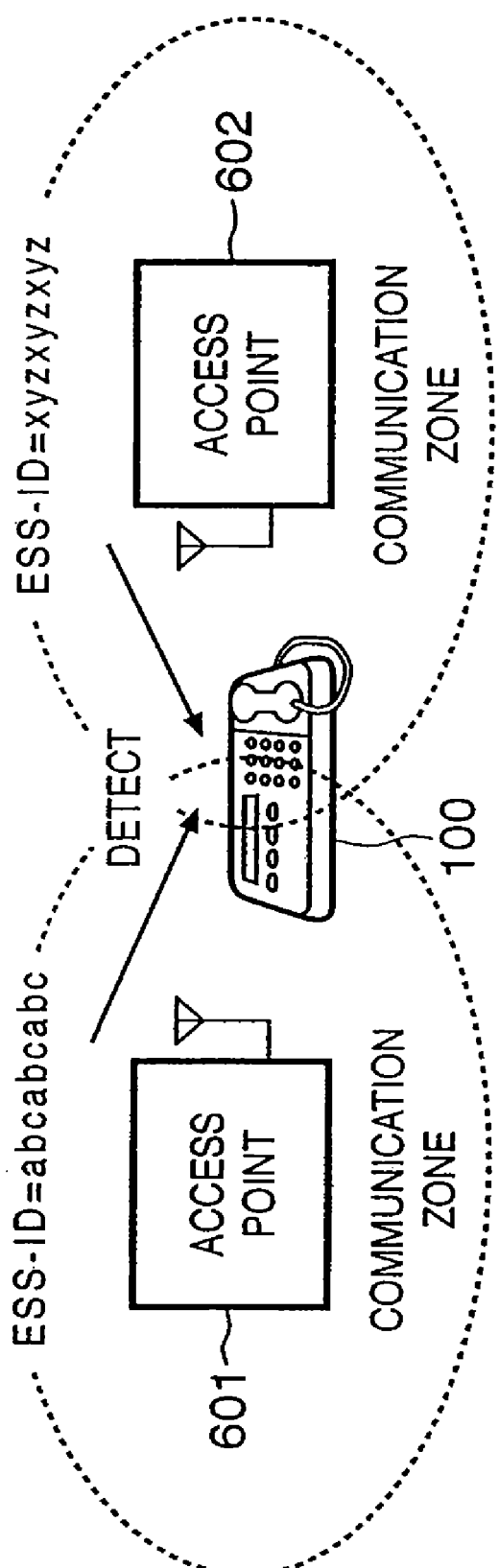
FIG. 6 is a diagram illustrating access points of neighboring wireless LAN systems.
Figure 7:
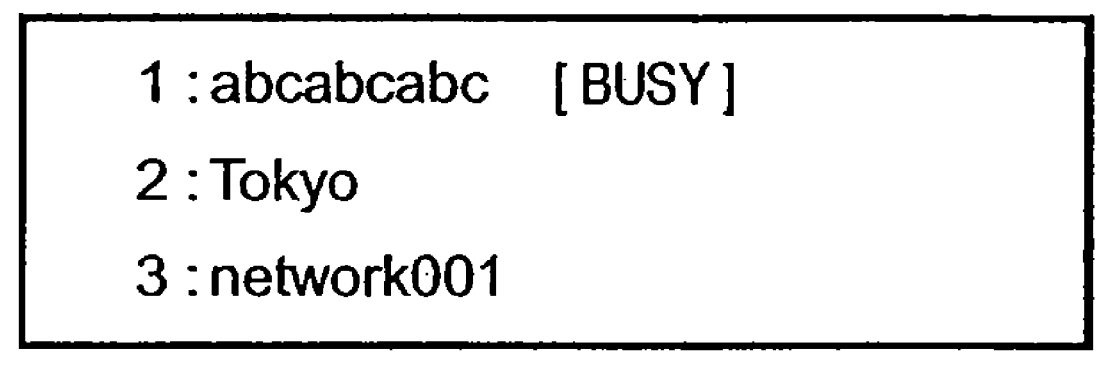
Figure 8:
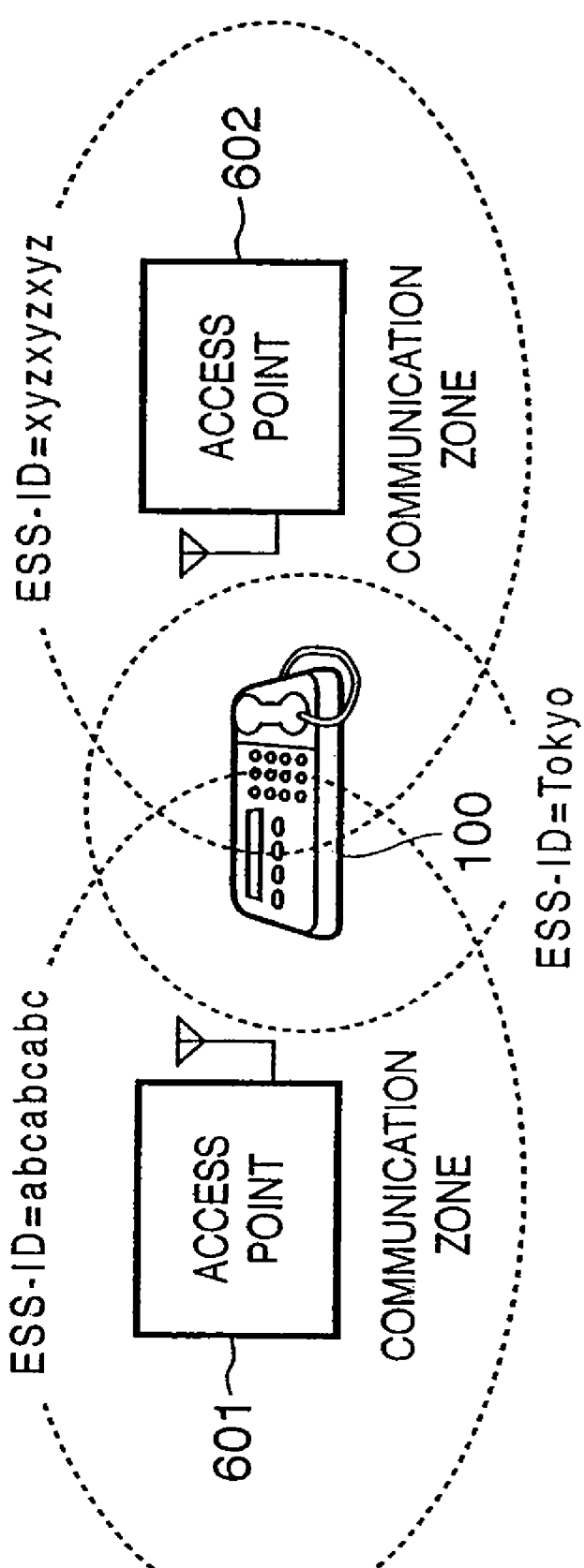
FIG. 8 is a diagram illustrating a state in which an independent wireless LAN system has been constructed anew.

Next, the wireless LAN communication unit 203 receives notification information being transmitted from peripheral wireless LAN access points 601, 602 of the kind shown in FIG. 6, and the controller 201 detects the ESS-IDs in the notification information of the peripheral wireless LAN access points 601, 602, compares them with all of the symbol strings in the memory 202 and outputs the result of the comparison. In the example depicted in FIG. 6, agreement is achieved with respect to "abcabcabc" and therefore the controller 201 displays "BUSY" in the field of numeral 1, as illustrated in FIG. 7. In a case where the user wishes to newly construct an independent wireless LAN system, the user selects a symbol string other than the busy "abcabcabc". As a result, the controller 201 sets the selected symbol string as ESS-ID and, as shown in FIG. 8, is capable of newly constructing an independent wireless LAN system whose ESS-ID is "Tokyo", for example.

By way of example, in order to set the ESS-ID to "Tokyo" as an access point of the new wireless LAN system, "2" being displayed to the left of "Tokyo" in FIG. 7 is entered using the numeral buttons 301. Alternatively, if it has been decided beforehand that the middle line among the three displayed lines is to be the line selected, then the ESS-ID can be set by pressing the enter button 304 under the conditions shown in FIG. 9.

Figure 10:
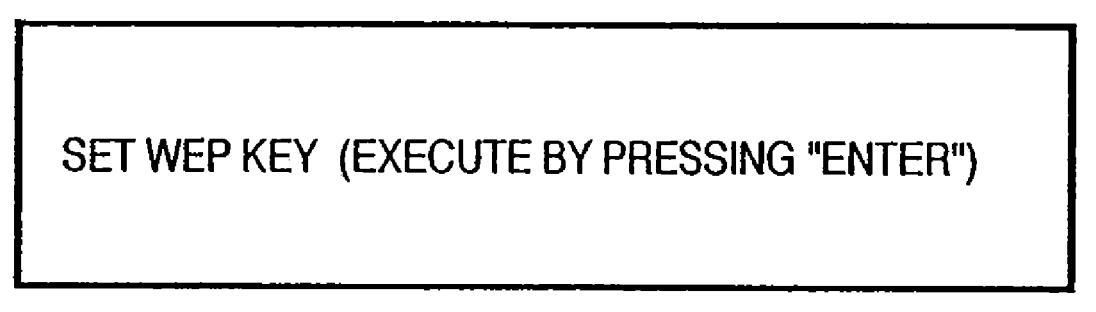
Figure 11:
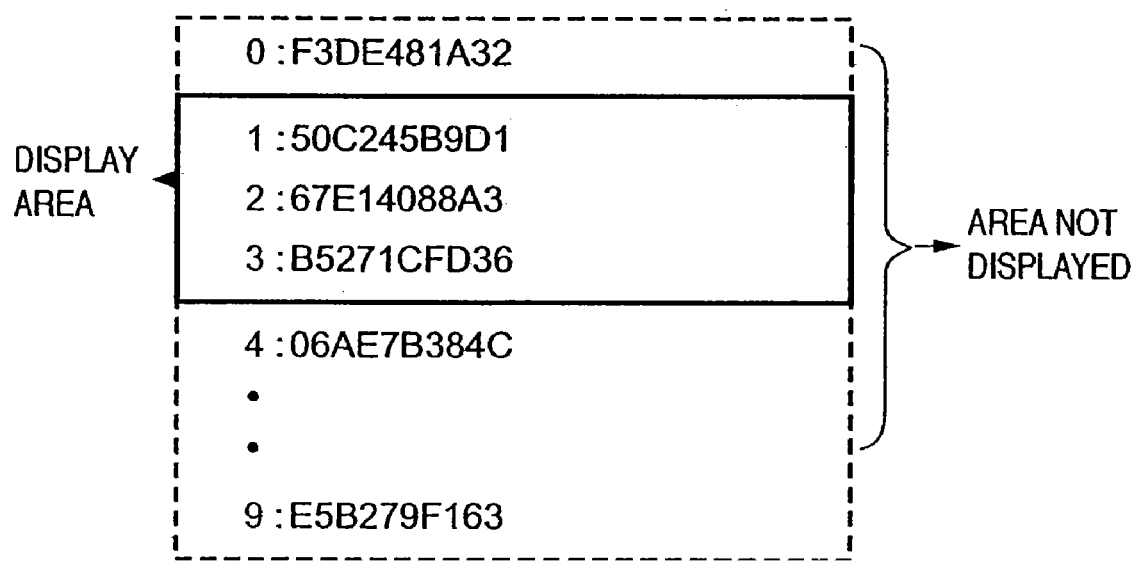
FIG. 11 is a diagram illustrating an example of display of numerals "0" to "9" and symbol strings of one or more characters corresponding to these numerals, these being provided for a WEP key.

Further, not only can the ESS-ID be set but it is also possible to similarly set an encryption key for communication data. To set the encryption key, the mode button 302 is pressed a prescribed number of times, whereupon the controller 201 causes the display panel 102 to display a screen of the kind shown in FIG. 10 for selecting a WEP key setting mode. The WEP-key setting mode is activated when the enter button 304 is pressed in accordance with this display on the screen. In the WEP-key setting mode, as shown in FIG. 11, correspondence between numerals 0 to 9 and symbol strings of one or more characters corresponding to the numerals is displayed. These strings are for the WEP key. Further, the corresponding relationship between the numerals and the symbol strings of one or more characters corresponding to the numerals has already been stored in the memory 202 in an area thereof separate from that in which the list of ESS-IDs has been stored.

In a case where "67E14088A3" has been set anew as the WEP key of the wireless LAN system, "2" is entered using the numeral buttons 301. Alternatively, if it has been decided beforehand that the middle line among the three displayed lines is to be the line selected, then the WEP key can be set by pressing the enter button 304 under the conditions shown in FIG. 11.

Thus, in accordance with the first embodiment, the prescribed settings of an access point can be made with facility when a facsimile machine is made to function as an access point and a wireless LAN system is constructed anew.

Further, though the first embodiment has been described taking as an example a case where prescribed settings are made for an access point, it goes without saying that prescribed settings for a station can also be performed with facility.

[Second Embodiment]

A second embodiment according to the present invention will now be described in detail with reference to the drawings.

The second embodiment will be described taking as an example a digital copier serving as a wireless LAN device (station) or access point connectable to a wireless LAN system compliant with IEEE Std 802.11.

Figure 12:
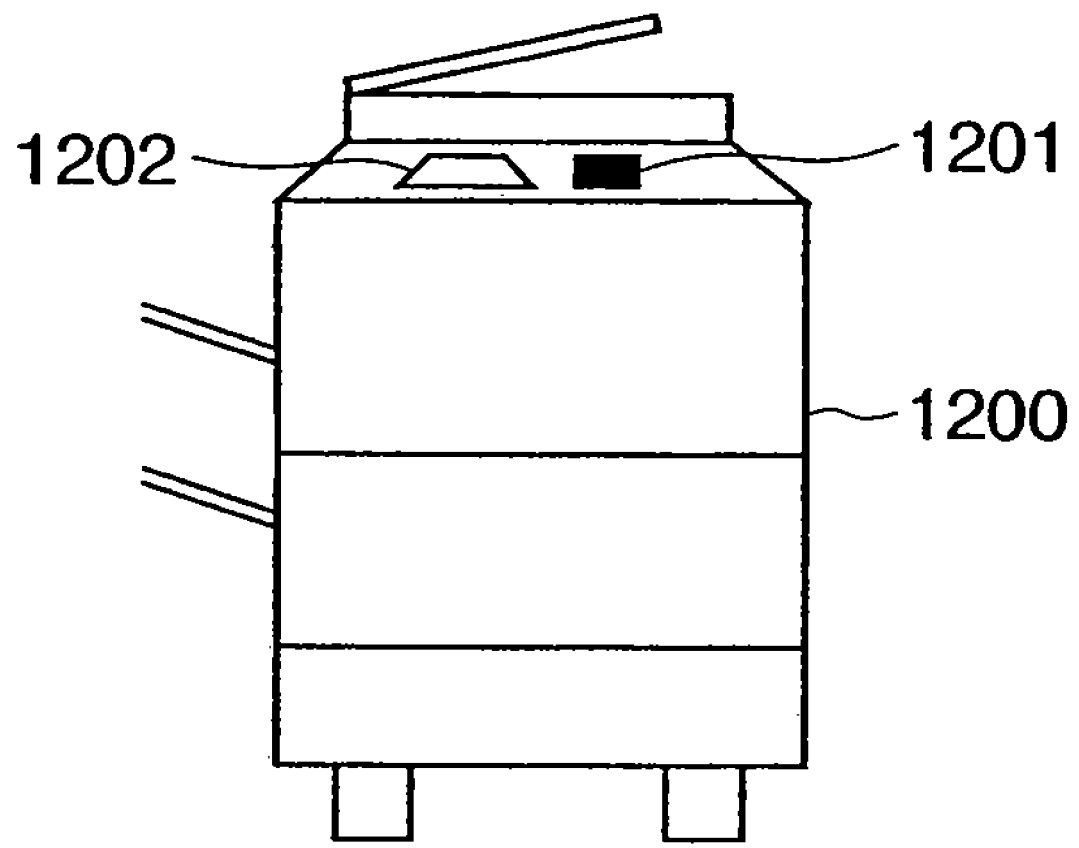
FIG. 12 is an external view of a digital copier according to a second embodiment of the present invention.

FIG. 12 is an external view of a digital copier according to the second embodiment of the present invention. This digital copier is provided in a form having a built-in wireless LAN communication unit, described later, and functions as a station. However, a wireless LAN communication unit may just as well be attached in freely removable fashion as set forth in the first embodiment.

Figure 14:
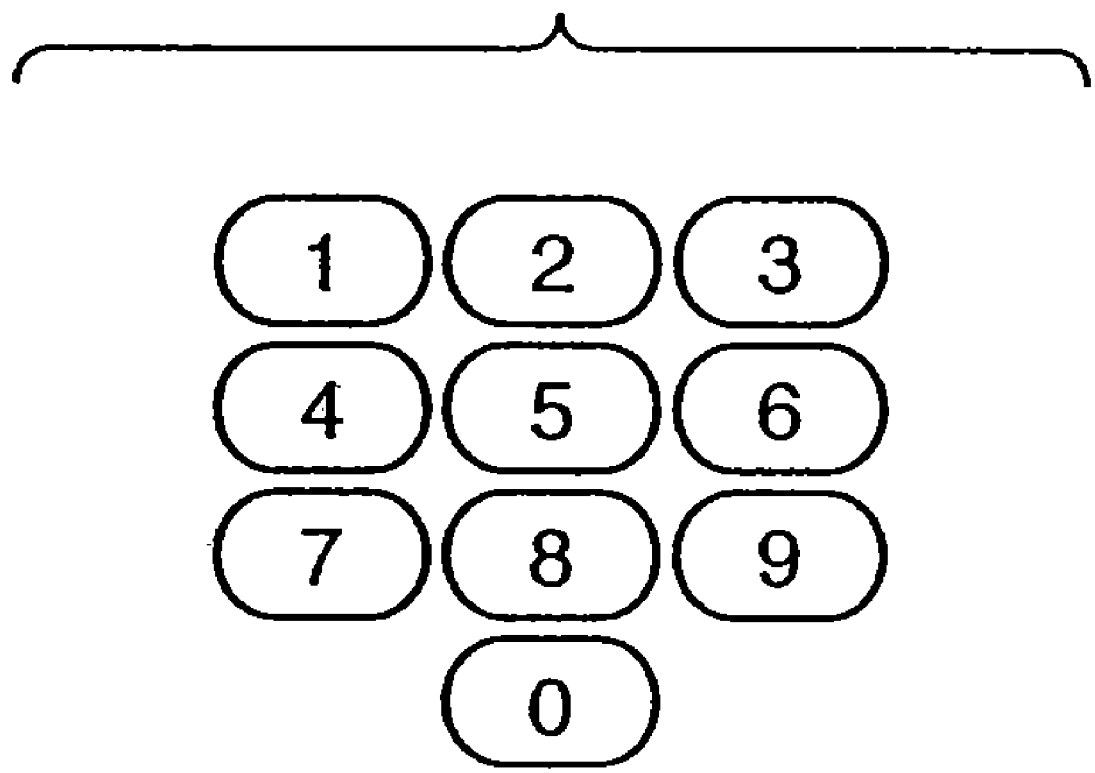
FIG. 14 is a diagram illustrating the details of numeral buttons.

As shown in FIG. 12, the digital copier has a main body 1200 provided with numeral buttons 1201 functioning as information input means. The numeral buttons 1201 are shown in detail in FIG. 14. A touch-sensitive panel 1202 functions as information output means and information input means.

Figure 13:
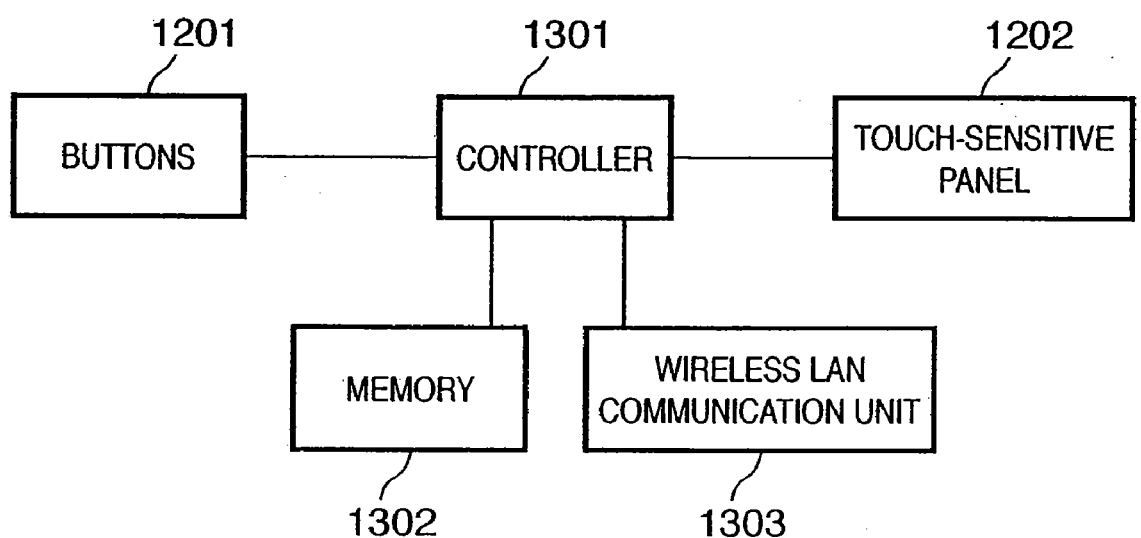
FIG. 13 is a block diagram illustrating components relating to the configuring of a wireless LAN system in a digital copier.

FIG. 13 is a block diagram illustrating components relating to the configuring of the wireless LAN system in the digital copier. Components same to those shown in FIG. 12 are designated by same reference characters and need not be described again.

A controller 1301 in FIG. 13 controls the overall digital copier 1200. A memory 1302, which serves as storage means, stores image data that has been read by an image reader, and other data. A wireless LAN communication unit 1303 controls communication in the form of a station of a wireless LAN system. The controller 1301 comprises a CPU for exercising control in accordance with a prescribed program, a RAM in which a work area used when the CPU executes control has been defined, and a ROM in which the program of the CPU and control data have been stored.

The controller 1301 sends and receives data to and from the buttons 1201, touch-sensitive panel 1202, memory 1302 and wireless LAN communication unit 1303 and processes data.

Described next is a method of setting up a digital copier to infrastructure mode or ad-hoc mode of a wireless LAN communication mode.

First, a screen of the kind shown in FIG. 15 for selecting a wireless LAN communication mode is displayed by pressing, a prescribed number of times, a portion indicating "SET" displayed on the touch-sensitive panel 1202. The mode for setting wireless LAN communication is established when a portion indicating "ENTER" displayed on the screen is pressed.

Figure 16:
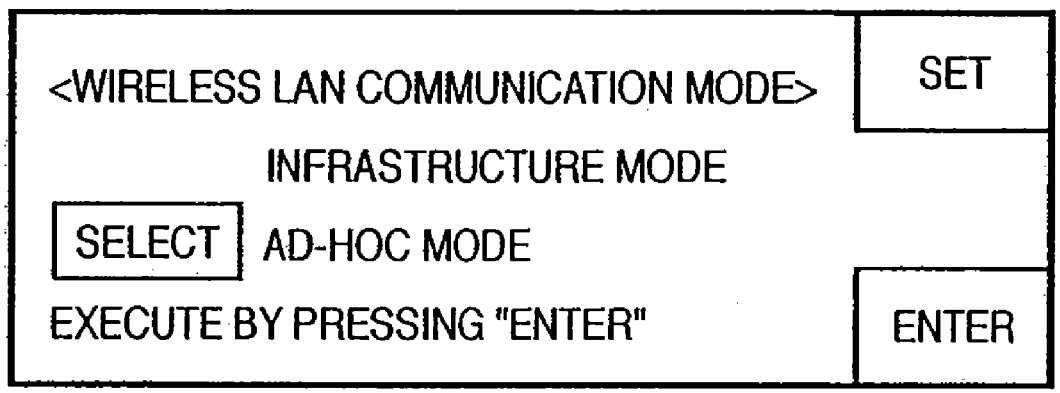
FIG. 16 is a diagram illustrating a screen for selecting whether a communication mode is infrastructure mode or ad hoc mode.
Figure 17:
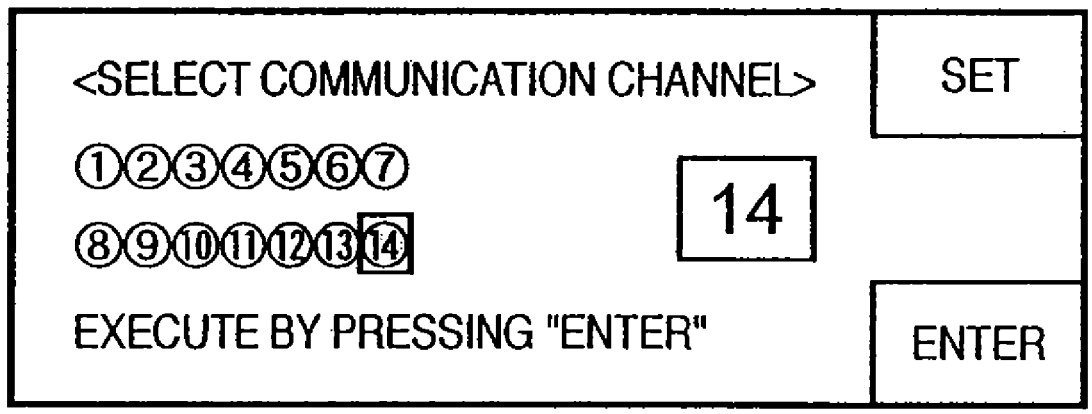
FIG. 17 is a diagram illustrating a screen for selecting a communication channel.

In the mode for setting wireless LAN communication, first a screen for selecting whether infrastructure mode or ad-hoc mode is displayed, as shown in FIG. 16. If the ad-hoc mode is selected and the portion indicating "ENTER" is pressed, a screen for selecting the communication channel is displayed, as illustrated in FIG. 17. The channel selection may be implemented by a method of inputting a numeral directly using the numeral buttons 1201 or by pressing a portion on which the numeral of the desired channel is being displayed among the numerals "1" to "14" displayed on the touch-sensitive panel 1202. Finally, by pressing the portion indicating "ENTER", the communication mode can be set to the ad-hoc mode.

In a case where the infrastructure mode has been selected on the screen shown in FIG. 16, a screen for setting the above-mentioned ESS-ID and, if necessary, the WEP key, is displayed. This procedure is in line with the setting method described in the first embodiment and need not be described again.

Thus, in accordance with the embodiments, as described above, the prescribed settings necessary for constructing a wireless LAN system can be made with facility by the wireless LAN communication device itself. In addition, it is possible to avoid interference between independent wireless LAN systems.

The present invention can be applied to a system constituted by a plurality of devices (e.g., a host computer, interface, reader, printer, etc.) or to an device comprising a single device (e.g., a copier or facsimile machine, etc.).

Furthermore, it goes without saying that the object of the invention is attained also by supplying a recording medium storing the program codes of the software for performing the functions of the foregoing embodiments to a system or an device, reading the program codes with a computer (e.g., a CPU or MPU) of the system or apparatus from the recording medium, and then executing the program codes.

In this case, the program codes read from the recording medium implement the novel functions of the embodiment and the recording medium storing the program codes constitutes the invention.

Examples of recording media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the recording medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

Thus, in accordance with the embodiments of the present invention, as described above, the prescribed settings necessary for constructing a network can be made with facility and it is possible to avoid interference between independent networks ascribable to settings.

As many apparently widely different embodiments of the present invention can be made without departing from the spirit and scope thereof, it is to be understood that the invention is not limited to the specific embodiments thereof except as defined in the appended claims.

What is claimed is:

1. A method of constructing a wireless network by a wireless communication apparatus having an operation unit, the method comprising:
    detecting network identification information being used in the vicinity by receiving a signal transmitted from another wireless communication apparatus;
    displaying on a display screen the detected network identification information and undetected network identification information in a manner as to distinguish the detected network identification information from the undetected network identification information and displaying on the display screen a plurality of symbols each representing a different one of a plurality of buttons of the operation unit, wherein each of the symbols is displayed so as to correspond to a different one of the network identification information such that a user can select network identification information by selecting the button corresponding to any one of the displayed symbols; and
    constructing a new wireless network of the undetected network identification information corresponding to the symbol of the button selected by the user,
    wherein the undetected network identification information is network identification information corresponding to not receiving a signal transmitted from another wireless communication apparatus.

2. The method according to claim 1, wherein, in the displaying step, the network identification information detected in the detecting step is displayed with a message representing that the network identification information is being used.

3. The method according to claim 2, wherein the network identification information comprises an ESS-ID,
    wherein the detected network identification information corresponds to an ESS-ID being used,
    wherein the undetected network identification information corresponds to an ESS-ID not being used, and
    wherein the message indicates that an ESS-ID is being used.

4. The method according to claim 1, wherein each of the symbols comprises a single digit number and each of the buttons corresponds to a respective single digit number.

5. The method according to claim 1, wherein the constructing step comprises setting a wireless access point's network identification information to the undetected network identification information corresponding to the symbol of the button selected by the user.

6. A wireless communication apparatus comprising:
    an operation unit configured to operate the wireless communication apparatus;
    a detection unit configured to detect network identification information being used in the vicinity by receiving a signal transmitted from another wireless communication apparatus;
    a display control unit configured to display on a display screen the detected network identification information and undetected network identification information in a manner as to distinguish the detected network identification information from the undetected network identification information and to display on the display screen a plurality of symbols each representing a different one of a plurality of buttons of the operation unit, wherein each of the symbols is displayed so as to correspond to a different one of the network identification information such that a user can select network identification information by selecting the button corresponding to any one of the displayed symbols; and
    a constructing unit configured to construct a new wireless network of the undetected network identification information corresponding to the symbol of the button selected by the user,
    wherein the undetected network identification information is network identification information corresponding to not receiving a signal transmitted from another wireless communication apparatus.

7. The apparatus according to claim 6, wherein said display control unit displays the network identification information detected by said detection unit with a message representing that the network identification information is being used.

8. The apparatus according to claim 7, wherein the network identification information comprises an ESS-ID,
    wherein the detected network identification information corresponds to an ESS-ID being used,
    wherein the undetected network identification information corresponds to an ESS-ID not being used, and
    wherein the message indicates that an ESS-ID is being used.

9. The apparatus according to claim 6, wherein each of the symbols comprises a single digit number and each of the buttons corresponds to a respective single digit number.

10. The apparatus according to claim 6, wherein the constructing unit constructs the new wireless network by setting a wireless access point's network identification information to the undetected network identification information corresponding to the symbol of the button selected by the user.

11. The apparatus according to claim 10, wherein the apparatus comprises the wireless access point.

12. The apparatus according to claim 10, wherein the undetected network identification information comprises an ESS-ID.

* * * * *